US012794705B2

(12) United States Patent
Elmenshawy et al.

(10) Patent No.: US 12,794,705 B2
(45) Date of Patent: Nov. 10, 2026

(54) UTILIZING DIGITAL CERTIFICATES GENERATED BASED ON SECURITY TOKENS TO ESTABLISH TRUST FOR INITIATING SECURE CONNECTIONS

(71) Applicant: Oracle International Corporation, Redwood Shores, CA (US)

(72) Inventors: Ayman Mohamed Aly Hassan Elmenshawy, Bellevue, WA (US); Abhinav Mishra, Livermore, CA (US); Karl Heiss, Raleigh, NC (US); Neal Tucker, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 217 days.

(21) Appl. No.: 18/763,974

(22) Filed: Jul. 3, 2024

(65) Prior Publication Data

US 2026/0012353 A1 Jan. 8, 2026

(51) Int. Cl.
*H04L 9/32* (2006.01)

(52) U.S. Cl.
CPC .......... *H04L 9/3247* (2013.01); *H04L 9/3263* (2013.01)

(58) Field of Classification Search
CPC ... H04L 9/3247; H04L 9/3263; H04L 9/3213; H04L 9/3268
See application file for complete search history.

(56) References Cited

U.S. PATENT DOCUMENTS 12,341,891 B2 * 6/2025 Van Cleve .............. H04L 63/10
2002/0184501 A1 * 12/2002 Bin Abdul Rahman .................... H04L 63/126 713/173
2015/0220917 A1 * 8/2015 Aabye ................ G06Q 20/3278 705/64
2016/0021116 A1 * 1/2016 Maguire ............... H04L 63/102 726/4
2016/0294809 A1 * 10/2016 LeSaint ................... H04L 63/12
2017/0093585 A1 * 3/2017 Lee ............................ H04L 9/14
2023/0308277 A1 * 9/2023 Van Cleve .......... H04L 63/0421
2024/0214194 A1 * 6/2024 Kapur ...................... H04L 9/088

FOREIGN PATENT DOCUMENTS

EP 3484097 A1 * 5/2019 ......... H04L 63/0428

* cited by examiner

*Primary Examiner* — Mohammed Waliullah
(74) *Attorney, Agent, or Firm* — Invoke

(57) ABSTRACT

A system establishes a secure connection between a first entity and a second entity upon validating a digital signature of a digital certificate. The digital signature is validated utilizing a trust anchor public key corresponding to a security token issued by a trust anchor that is trusted by the first entity and the second entity. In response to a request to establish the secure connection, the system validates the security token issued by the trust anchor to establish trust between the first entity and the second entity. Upon validating the security token, the system validates the digital signature of the digital certificate utilizing an entity public key embedded in the security token. Based on the trust established by the security token, the digital certificate is trusted upon validating the digital signature. Upon validating the digital signature, the system establishes the secure connection between the first entity and the second entity.

20 Claims, 8 Drawing Sheets

UTILIZING DIGITAL CERTIFICATES GENERATED BASED ON SECURITY TOKENS TO ESTABLISH TRUST FOR INITIATING SECURE CONNECTIONS

TECHNICAL FIELD

The present disclosure relates to establishing secure connections between entities of a computing environment. More particularly, the present disclosure relates to utilizing digital certificates to establish secure connections between entities in a cloud computing environment.

BACKGROUND

A computing environment, such as a cloud computing environment, includes various entities that establish secure connections with one another to protect the security and integrity of messages exchanged with one another. When establishing a secure connection, the entities exchange digital certificates to authenticate one another. The digital certificates are issued to the entities directly or indirectly by a certificate authority (CA) that both entities trust. When an entity receives a digital certificate from another entity, the entity executes a validation process to validate the digital certificate. The validation process includes validating that the digital certificate was issued by a trusted CA. Once validated, the entity that received the digital certificate trusts the entity that provided the digital certificate based on the trust in the CA that issued the digital certificate. Once trust has been established between the entities, the entities can initiate the secure connection and can begin securely exchanging messages with one another.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment and refer to at least one embodiment. In the drawings.

DETAILED DESCRIPTION

Figure 1:
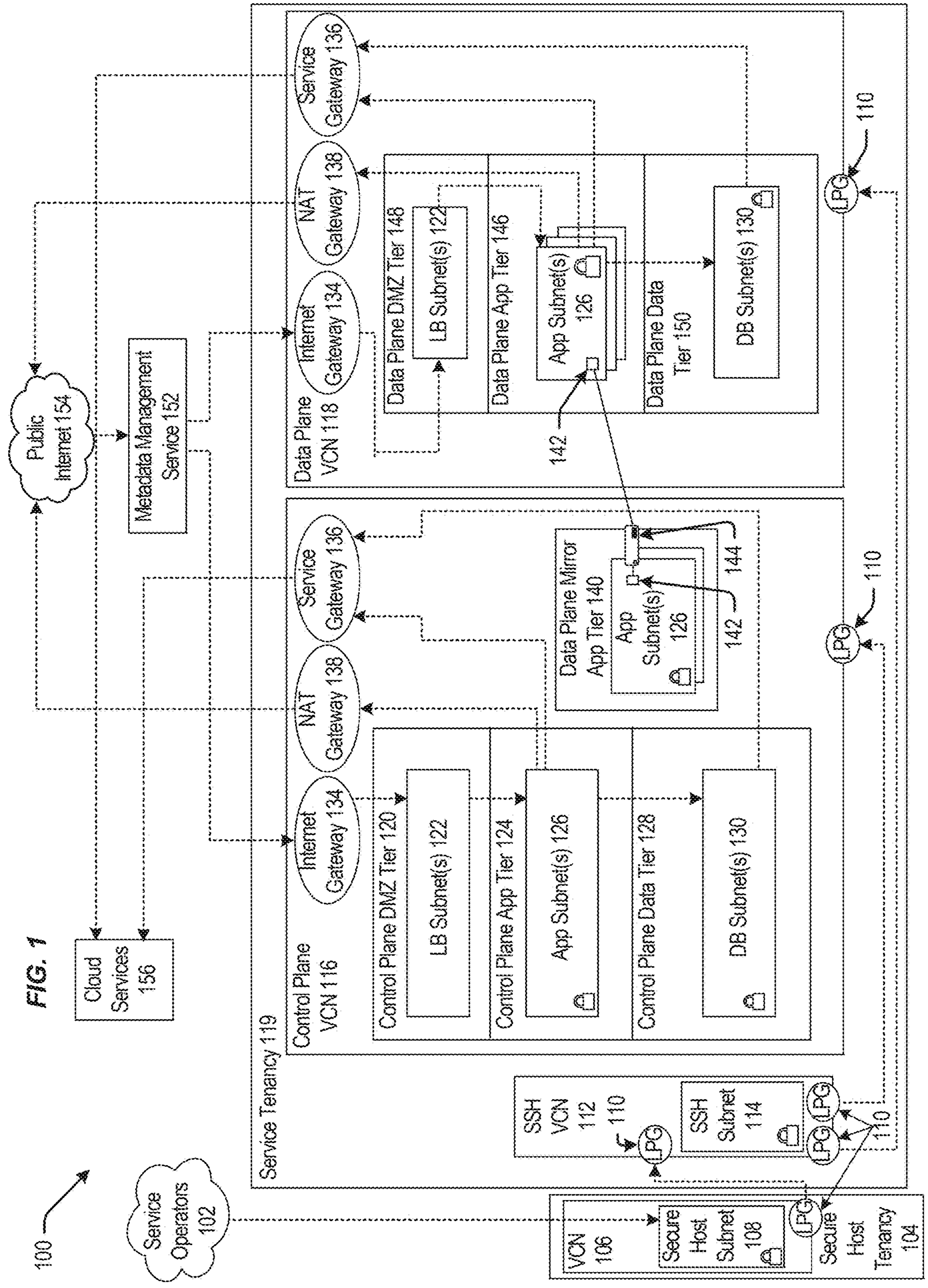
FIGS. 1-4 are block diagrams illustrating patterns for implementing a cloud infrastructure as a service system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. CLOUD COMPUTING TECHNOLOGY
3. COMPUTER SYSTEM
4. TOKEN-BASED DIGITAL CERTIFICATES
5. SYSTEM ARCHITECTURE FOR UTILIZING TOKEN-BASED DIGITAL CERTIFICATES
6. EXAMPLE OPERATIONS FOR UTILIZING TOKEN-BASED DIGITAL CERTIFICATES
7. MISCELLANEOUS; EXTENSIONS

1. General Overview

A system establishes a secure connection between a first entity and a second entity upon the first entity validating a digital certificate that is generated, by or on behalf of the second entity, based on a security token issued to the second entity by a trust anchor that is trusted by the first entity. In one example, the secure connection is established upon the first entity and the second entity mutually validating a digital certificate generated based on a security token issued to the respective other entity. The system may utilize digital certificates that are generated based on security tokens to allow entities to establish trust based on digital certificates in computing environments where one or both entities does not have access to a CA that is trusted by both entities for issuing digital certificates. In one example, a computing environment includes a CA that is deployed at a first abstraction layer, such as an infrastructure layer, and the entities are deployed in the computing environment at a second abstraction layer, such as an application layer, that is at least partially isolated from the first abstraction layer. The CA is inaccessible to the entities deployed at the second abstraction layer based at least in part on the second abstraction layer being at least partially isolated from the first abstraction layer.

By utilizing digital certificates that are generated based on security tokens issued by a trust anchor that is trusted by the entities, entities can utilize the digital certificates to establish trust for initiating secure connections even when the entities do not have access to a CA. The trust anchor may include a computing resource that issues security tokens and that is trusted by the entities. Example trust anchors include identity access and management services (identity services), federated identity providers, authorization servers, and gateway services. Because the entities trust the trust anchor, the trust is established between the entities by validating the security tokens issued by the trust anchor. Based on the trust established by the security tokens, the entities trust the digital certificates that are generated based on the security tokens upon validating the digital certificates. With trust established based on the trust anchor, entities may utilize the digital certificate generated based on security tokens issued by the trust anchor in security protocols for establishing secure connections that establish trust based on digital certificates. These security protocols may include transport layer security protocol (TLS), mutual transport layer security protocol (mTLS), internet key exchange (IKE), or hypertext transfer protocol secure (HTTPS).

To validate a digital certificate generated based on a security token issued by a trust anchor, the system validates the security token utilizing a token public key corresponding to the security token. The token public key is obtained from the trust anchor that issued the security token. Validating the security token via the token public key establishes trust between the first entity and the second entity. Upon validating the security token, the system utilizes an entity public key embedded in the security token to validate a digital signature of the digital certificate that was generated utilizing a token private key corresponding to the security token. Based on the trust established by the security token, the digital certificate is trusted upon validating the digital signature. Upon validating the digital signature, the system establishes the secure connection between the first entity and the second entity.

One or more embodiments described in this Specification and/or recited in the claims may not be included in this General Overview section.

2. Cloud Computing Technology

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components; example services include billing software, monitoring software, logging software, load balancing software, clustering software, etc. Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on the VMs, deploy middleware such as databases, create storage buckets for workloads and backups, and install enterprise software into that VM. Customers can then use the provider's services to perform various functions, including balancing network traffic, troubleshooting application issues, monitoring performance, and managing disaster recovery, etc.

In some cases, a cloud computing model will involve the participation of a cloud provider. The cloud provider may, but need not, be a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider below the hypervisor layer (e.g., the servers, storage, network hardware, and virtualization). Thus, the customer may be responsible for handling (OS), middleware, and/or application deployment such as on self-service virtual machines. The self-service virtual machines can be spun up on demand.

In some examples, IaaS provisioning may refer to acquiring computers or virtual hosts for use, even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how components interact) can be defined by one or more configuration files. Thus, the overall topology of the infrastructure (e.g., what resources depend on one another and how resources work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually and/or using a provisioning tool) prior to deployment of code to be executed on the infrastructure. However, in some examples, the infrastructure that will deploy the code may first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100 according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, such as portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers, including personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems such as Google Chrome OS. Additionally, or alternatively, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116. The app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively coupled to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way; the service gateway 136 can make API calls to cloud services 156, and cloud services 156 can send requested data to the service gateway 136. However, cloud services 156 may not initiate API calls to the service gateway 136.

In some examples, the secure host tenancy 104 can be directly connected to the service tenancy 119. The service tenancy 119 may otherwise be isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118. The control plane VCN 116 and the data plane VCN 118 may be contained in the service tenancy 119. This embodiment can enable isolation of networks that may prevent users or customers from interacting with other users,' or other customers,' resources. Also, this embodiment may allow users or customers of the system to store databases privately without needing to rely on public Internet 154 for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119. The service tenancy 119 may be isolated from public Internet 154.

Figure 2:
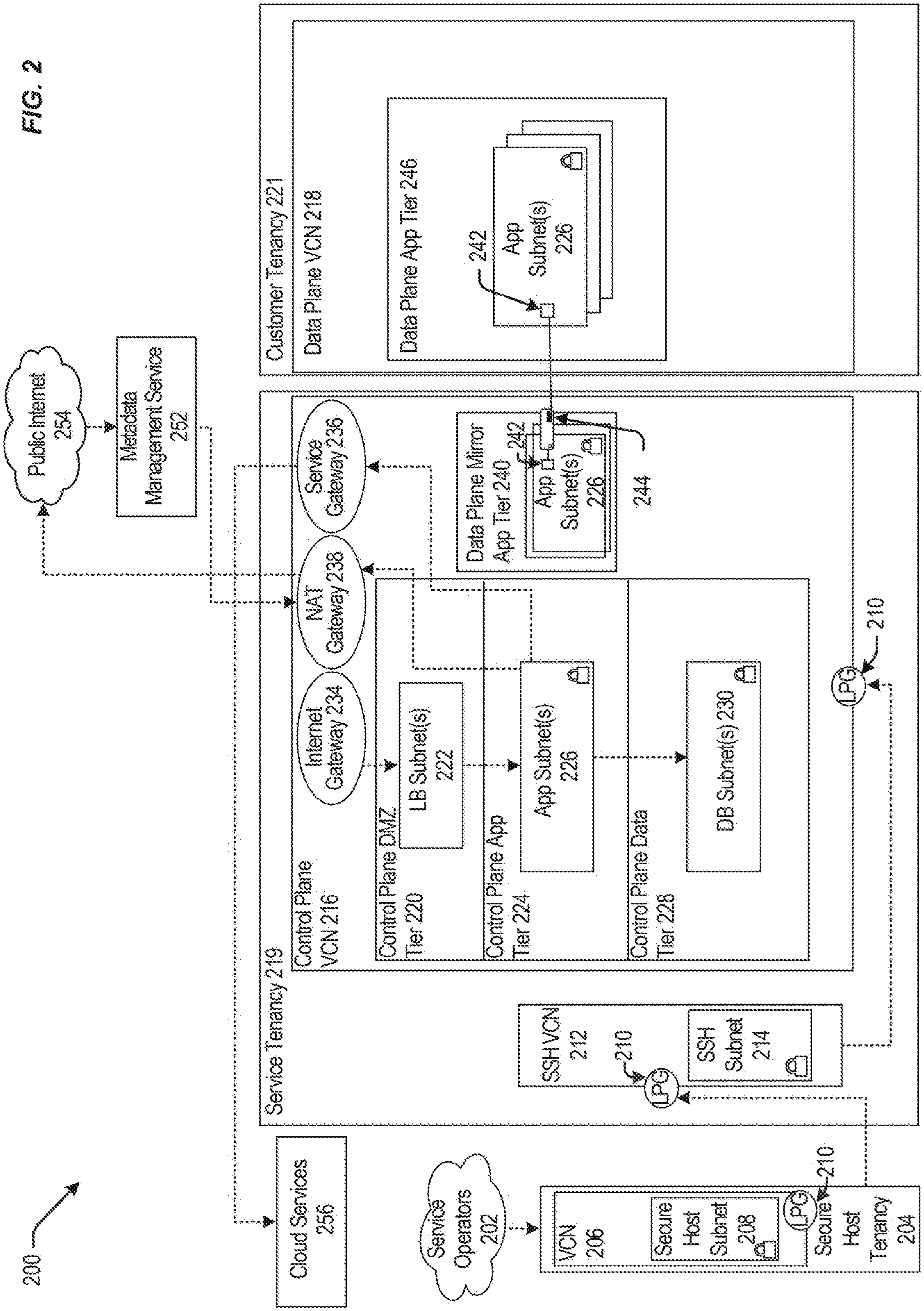

FIG. 2 is a block diagram illustrating another example pattern of an IaaS architecture 200 according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), and a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216. The app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively coupled to cloud services 256 (e.g., cloud services 156 of FIG. 1).

In some examples, the data plane VCN 218 can be contained in the customer tenancy 221. In this case, the IaaS provider may provide the control plane VCN 216 per customer, and the IaaS provider may, for the customer, set up a unique, compute instance 244 that is contained in the service tenancy 219. Compute instance 244 may allow communication between the control plane VCN 216 contained in the service tenancy 219 and the data plane VCN 218 that is contained in the customer tenancy 221. The compute instance 244 may allow resources provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment or other usage of resources of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1" may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
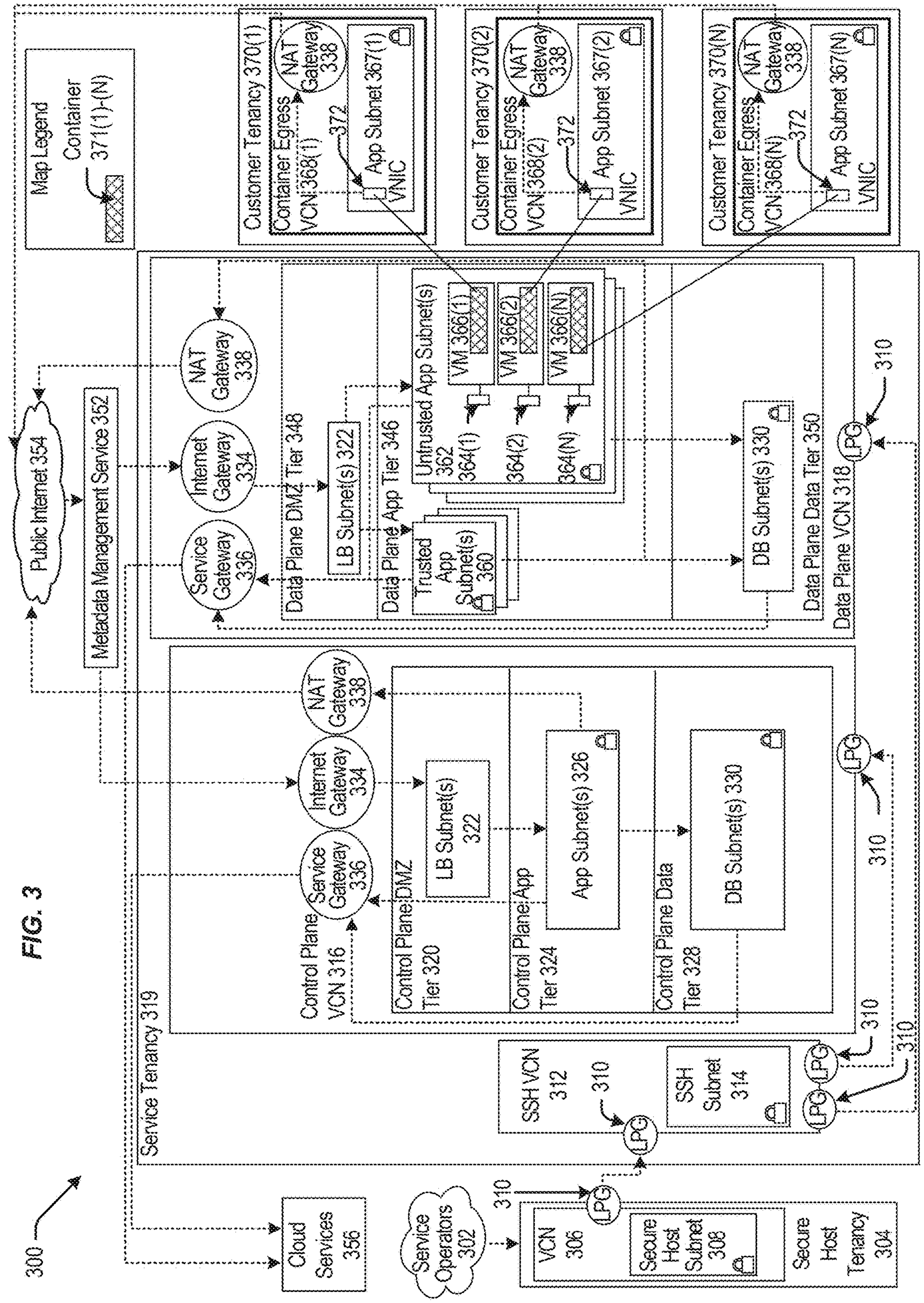

FIG. 3 is a block diagram illustrating another example pattern of an IaaS architecture 300 according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), and a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360, untrusted app subnet(s) 362 of the data plane app tier 346, and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Tenant(s) VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether or not to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code), where the containers 381(1)-(N) may be contained in at least the VM 366(1)-(N) that are contained in the untrusted app subnet(s) 362) that may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of the customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
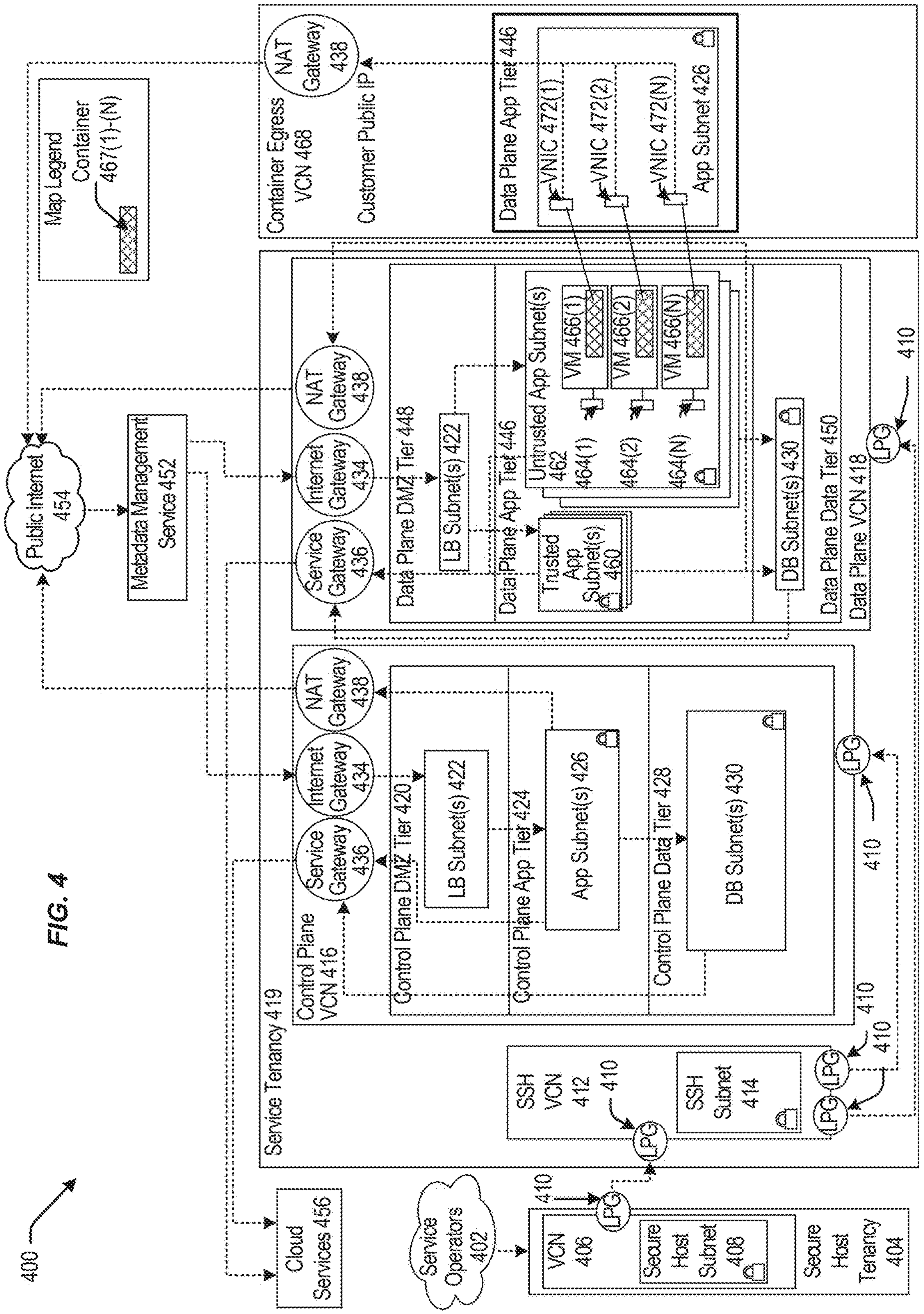

FIG. 4 is a block diagram illustrating another example pattern of an IaaS architecture 400 according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), and a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively coupled to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for customers can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that request a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, and 400 may include components that are different and/or additional to the components shown in the figures. Further, the embodiments shown in the figures represent non-exhaustive examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from one other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as execution of a particular application and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network such as a physical network. A node in an overlay network corresponds to a respective node in the underlying network. Hence, a node in an overlay network is associated with both an overlay address (to address to the overlay node) and an underlay address (to address the underlay node that implements the overlay node). An overlay node may be a digital device and/or a software process, such as a virtual machine, an application instance, or a thread. A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of one another. Network resources are dynamically assigned to the requests and/or clients on an on-demand basis. Network resources assigned to a request and/or client may be scaled up or down based on one or more of the following: (a) the computing services requested by a particular client, (b) the aggregated computing services requested by a particular tenant, or (c) the aggregated computing services requested of the computer network. Such a computer network may be referred to as a "cloud network."

In an embodiment, a service provider provides a cloud network to one or more end users. Various service models may be implemented by the cloud network, including, but not limited, to Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including, but not limited to, a private cloud, a public cloud, and a hybrid cloud. In a private cloud, network resources are provisioned for exclusive use by a particular group of one or more entities; the term "entity" as used herein refers to a corporation, organization, person, or other entity. The network resources may be local to and/or remote from the premises of the particular group of entities. In a public cloud, cloud resources are provisioned for multiple entities that are independent from one another (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants.

In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on one other. A call from an application at the private cloud to an application at the public cloud (and vice versa) may be executed through the interface.

In an embodiment, tenants of a multi-tenant computer network are independent of one another. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with other tenants. Various tenant isolation approaches may be used.

In an embodiment, a tenant is associated with a tenant ID. The network resource of the multi-tenant computer network is tagged with a tenant ID. A tenant is permitted access to a particular network resource when the tenant and the particular network resources are associated with a same tenant ID.

In an embodiment, a tenant is associated with a tenant ID. An application, implemented by the computer network, is tagged with a tenant ID. Additionally, or alternatively, data structures and/or datasets, stored by the computer network, are tagged with a tenant ID. A tenant is permitted access to a particular application, data structure, and/or dataset when the tenant and the particular application, data structure, and/or dataset are associated with a same tenant ID.

As an example, a database implemented by a multi-tenant computer network may be tagged with a tenant ID. A tenant associated with the corresponding tenant ID may access data of a particular database. As another example, an entry in a database implemented by a multi-tenant computer network may be tagged with a tenant ID. A tenant associated with the corresponding tenant ID may access data of a particular entry. However, multiple tenants may share the database.

In an embodiment, a subscription list identifies a set of tenants, and, for a particular tenant, a set of applications that the particular tenant is authorized to access. For a particular application, a list of tenant IDs of tenants authorized to access the particular application is stored. A tenant is permitted access to a particular application when the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

3. Computer System

Figure 5:
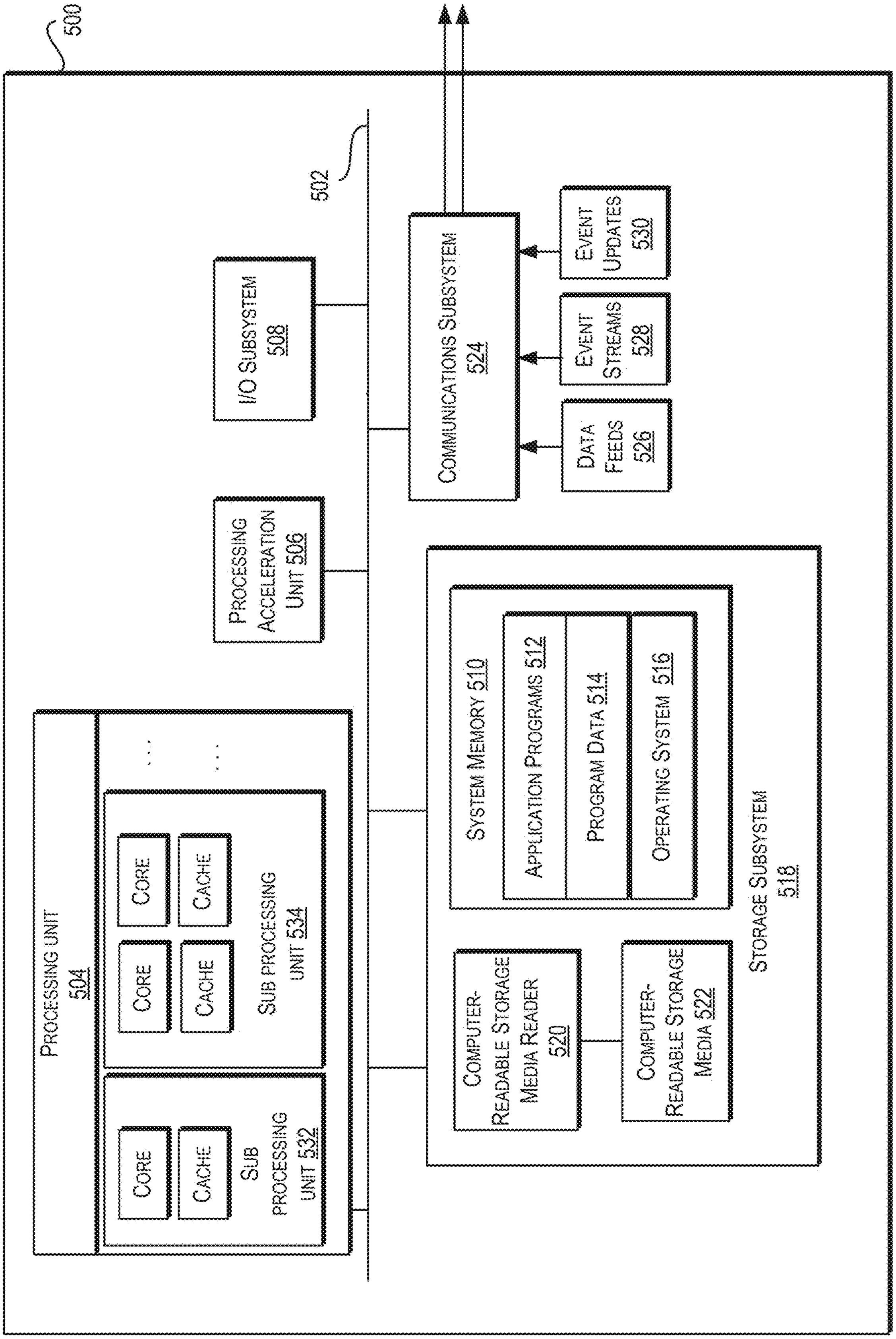
FIG. 5 is a hardware system in accordance with one or more embodiments.

FIG. 5 illustrates an example computer system 500. An embodiment of the disclosure may be implemented upon the computer system 500. As shown in FIG. 5, computer system 500 includes a processing unit 504 that communicates with peripheral subsystems via a bus subsystem 502. These peripheral subsystems may include a processing acceleration unit 506, an I/O subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 to communicate with one another as intended. Although bus subsystem 502 is shown schematically as a single bus, alternative embodiments of the bus subsystem may utilize multiple buses. Bus subsystem 502 may be any of several types of bus structures, including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Additionally, such architectures may be implemented as a Mezzanine bus manufactured to the IEEE P1386.1 standard.

Processing unit 504 controls the operation of computer system 500. Processing unit 504 can be implemented as one or more integrated circuits (e.g., a conventional microprocessor or microcontroller). One or more processors may be included in processing unit 504. These processors may include single core or multicore processors. In certain embodiments, processing unit 504 may be implemented as one or more independent processing units 532 and/or 534 with single or multicore processors included in the processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, the program code to be executed can be wholly or partially resident in processing unit 504 and/or in storage subsystem 518. Through suitable programming, processing unit 504 can provide various functionalities described above. Computer system 500 may additionally include a processing acceleration unit 506 that can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include medical imaging input devices such as computed tomography, magnetic resonance imaging, position emission tomography, or medical ultrasonography devices. User interface input devices may also include audio input devices such as MIDI keyboards, digital musical instruments, and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include any type of device and mechanism for outputting information from computer system 500 to a user or other computer. For example, user interface output devices may include, without limitation, a variety of display devices that visually convey text, graphics, and audio/video information, such as monitors, printers, speakers, headphones, automotive navigation systems, plotters, voice output devices, and modems.

Computer system 500 may comprise a storage subsystem 518 that provides a tangible non-transitory computer-readable media for storing software and data constructs that provide the functionality of the embodiments described in this disclosure. The non-transitory computer-readable media includes instructions that cause performance of operations described herein. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components, including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various programs may be loaded into system memory 510 including, but not limited to, client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random-access memory (RAM)) and/or non-volatile memory (such as read-only memory (ROM), flash memory, etc.). Different types of RAM configurations may be provided, including a static random-access memory (SRAM), a dynamic random-access memory (DRAM), and others. In some implementations, system memory 510 may include a basic input/output system (BIOS) containing basic routines that help to transfer information between elements within computer system 500 such as during start-up.

Computer-readable storage media 522 may represent remote, local, fixed, and/or removable storage devices plus storage media for temporarily and/or more permanently containing, storing, computer-readable information for use by computer system 500, including instructions executable by processing unit 504 of computer system 500.

Computer-readable storage media 522 can include any appropriate media known or used in the art, including storage media and communication media, such as but not limited to volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include solid-state drives (SSD) based on non-volatile memory, such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments, communications subsystem 524 can include radio frequency (RF) transceiver components to access wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services, such as Twitter® feeds, Facebook® updates, web feeds such as Rich Site Summary (RSS) feeds, and/or real-time updates from one or more third party information sources.

Additionally, communications subsystem 524 may be configured to receive data in the form of continuous data streams. The continuous data streams may include event streams 528 of real-time events and/or event updates 530 that may be continuous or unbounded in nature with no explicit end. Examples of applications that generate continuous data may include sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended as a non-limiting example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

4. Token-Based Digital Certificates

One or more embodiments generate and/or utilize token-based digital certificates. A token-based digital certificate may be generated by an entity that utilizes the digital certificate to establish trust with another entity. The entity may self-generate the token-based digital certificate. The token-based digital certificate may be a self-signed digital certificate. Additionally, or alternatively, the entity may utilize a certificate generation service to generate the token-based digital certificate. The certificate generation service may generate token-based digital certificates for one or more entities.

As used herein, the term "digital certificate" refers to an electronic document that is utilized to prove the validity of a public key. A digital certificate may be utilized to establish trust between entities when initiating a secure connection between the entities. A digital certificate serves as a form of identification, providing assurance that a particular public key belongs to the entity claimed by the certificate. A digital certificate may be configured according to a standard format such as a public key certificate format. One example of a public key certificate format is the X.509 standard format. A digital certificate may be a CA certificate, a CA-based digital certificate, or a token-based digital certificate.

As used herein, the term "certificate authority certificate" or "CA certificate" refers to a digital certificate issued by a certificate authority or CA to establish its own identity and authenticity. A CA certificate may be used to sign and issue CA-based digital certificates, including those used for establishing secure connections for secure communication between entities.

As used herein, the term "certificate authority" or "CA" refers to an entity responsible for issuing and managing CA-based digital certificates. The certificate authority verifies the identity of entities and digitally signs CA-based digital certificates issued to the entities to attest to their authenticity.

As used herein, the term "CA-based digital certificate" refers to a digital certificate issued to an entity associated with a virtual cloud network. An entity may utilize a CA-based digital certificate issued to the entity by a CA to verify the identity of the entity and to establish trust with other entities based on the trust in the CA, for example, when initiating a secure connection to engage in secure communication with another entity. A chain of trust for a CA-based digital certificate is based on a digital signature of the CA appended to the CA-based digital certificate.

As used herein, the term "token-based digital certificate" refers to a digital certificate that includes a digital signature for validating the digital certificate that is generated based on a private key of a security token issued by a trust anchor other than a CA. The digital signature may be appended to the token-based digital certificate. In one example, a token-based digital certificate includes the security token corresponding to the private key utilized to generate the digital signature that is appended to the token-based digital certificate. The security token may be embedded in the token-based digital certificate. Additionally, or alternatively, a token-based digital certificate may include a public key corresponding to the private key of the security token utilized to generate the digital signature that is appended to the token-based digital certificate. In one example, the public key is embedded in the security token, and the security token is embedded in the digital certificate. Additionally, or alternatively, the public key may be extracted from the security token and embedded in the token-based digital certificate when generating the token-based digital certificate. A chain of trust for a token-based digital certificate may be based at least in part on a valid security token, issued by a trust anchor, being embedded in the token-based digital certificate. Additionally, or alternatively, a chain of trust for a token-based digital certificate may be based at least in part on a digital signature that was generated by an entity certificate embedded in a valid security token, issued by a trust anchor, being appended to the token-based digital certificate.

The security token includes a token payload and an entity private key generated by the trust anchor that issued the token. The token includes a trust anchor digital signature appended to the security token. The trust anchor digital signature is generated by the trust anchor utilizing a token private key that is kept secret by the trust anchor. The trust anchor digital signature can be validated utilizing a token public key corresponding to the token private key. The token public key and the token private key represent a token key pair. The trust anchor may distribute the token public key to entities that may validate the security token. Additionally, or alternatively, the token public key may be stored in a location that is generally available to entities that may validate the security token.

The entity private key corresponding to the security token is kept secret by the entity that holds the security token. The token payload includes an entity public key corresponding to the entity public key. The entity public key and the entity private key represent an entity key pair. When the entity utilizes the security token, for example, as a credential, the entity generates an entity digital signature over the token payload utilizing the entity private key. The entity presents the security token to a recipient as a credential along with the entity digital signature generated utilizing the entity private key. The recipient extracts the entity public key from the token payload of the security token and utilizes the entity public key to verify the entity digital signature generated using the entity private key. To generate a token-based digital certificate, an entity obtains a security token from a trust anchor and, upon having obtained the security token, the entity utilizes the security token to generate the token-based digital certificate at least by utilizing the entity private key of the security token to generate an entity digital signature for the digital certificate. In one example, the entity initializes a certificate data structure, generates an entity digital signature utilizing the entity private key of the security token, and appends the entity digital signature to the certificate data structure. In one example, the entity may embed the security token in the certificate data structure. Additionally, or alternatively, the security token may be provided to a recipient together with the token-based digital certificate.

When the entity utilizes the token-based digital certificate, for example, as a credential, the entity presents the token-based digital certificate to a recipient. The security token may be embedded in the token-based digital certificate, and/or the entity may present the security token to the recipient together with the digital certificate. The recipient validates the security token at least by utilizing the token public key of the trust anchor to validate the trust anchor digital signature. Because the recipient trusts the trust anchor, the recipient trusts the entity that presented the security token that was issued by the trust anchor upon validating the security token using the trust anchor public key. The recipient validates the token-based digital certificate at least by extracting the entity public key from the token payload of the security token and utilizing the entity public key to verify the entity digital signature appended to the token-based digital certificate. Based on the trust established by the security token, the recipient trusts the token-based digital certificate upon validating the entity digital signature that was generated by the entity private key corresponding to the security token and appended to the token-based digital certificate.

As used herein, the term "security token" refers to a digital artifact that is issued to an entity for the purpose of authenticating the entity based on claims about the entity included in a payload of the digital artifact. A security token may include identity claims that identify a holder of the security token. Additionally, or alternatively, a security token may include permission claims that define one or more roles, actions, and/or resources that a holder of the security token is authorized to access. In one example, a security token includes dynamic claims, such as identity claims and/or permissions claims, meaning that the claims may change over time. In one example, a security token is self-contained, meaning that information for authentication and authorization is contained within the security token. Additionally, or alternatively, a security token may be stateless, meaning that it is unnecessary for a server to maintain session state for a session initiated based on the token, for example, because the information for authentication and authorization is contained within the security token. The term "security token" does not include digital certificates.

In one example, a security token is a proof of possession token. A proof of possession token includes a public key that can be utilized to validate a digital signature that is generated by a private key held by the holder of the token. The digital signature may be appended to the proof of possession token. Additionally, or alternatively, the digital signature may be included in a message that contains and/or that is associated with the proof of possession token.

A security token may be one or more of the following: an authentication token, an access token, a refresh token, or a session token, as well as combinations of these. An entity may utilize an authentication token to prove the identity of the entity. An entity may utilize an access token to obtain access to a set of one or more resources. An entity may utilize a refresh token to obtain new access tokens, for example, without requiring the entity to re-authenticate. An entity may utilize a session token to maintain a session state, for example, across multiple requests in a computing environment. A security token may be configured as a JavaScript Object Notation web token (JSON web token). In one example, an authentication token is configured as a JSON web token. Additionally, or alternatively, a security token may be configured as an OAuth 2.0 token. In one example, an access token is configured as an OAuth 2.0 token.

A security token may be issued by a trust anchor. As used herein, the term "trust anchor" refers to an entity of a computing network that other entities within the computing network implicitly trust. The implicit trust in the trust anchor may be based on one or more of the following: interoperability within the computing network, authentication mechanisms, security protocols, compliance with standards, reputation, reliability, or service level agreements. A trust anchor serves as a reference point for establishing trust relationships between entities of the computing network.

Example trust anchors include identity services, authentication services, identity providers, federated identity providers, authorization servers, and gateway services. An identity service includes a platform or framework that manages and controls digital identities and access permissions for a computing environment. An identity service may include features for provisioning, authentication, and/or authorization of entities of the computing environment. An authentication service includes features for verifying the identity of entities attempting to access a computing environment. An identity service may include an authentication service. An identity provider is a trusted entity or service that authenticates entities and issues digital identities or tokens that can be used to access resources of a computing environment. A federated identity provider is an identity provider that establishes trust relationships with other identity providers and service providers, for example, to facilitate secure authentication and authorization across multiple domains or regions of a computing environment. A federated identity provider may allow entities to access resources using digital identities assigned to the entities, for example, without needing separate accounts for separate service. An identity service may serve as an identity provider such as a federated identity provider. An authorization server is a component or service that manages and enforces access control policies for a computing environment. An authorization server may verify permissions associated with authenticated entities, issue security tokens, and/or grant authorizations based on access policies. An identity service may serve as an authorization server. A gateway service is an intermediary component or service that acts as an entry point or interface between different systems, networks, or protocols. A gateway service may provide functionalities, such as routing, protocol translation, security enforcement, and/or traffic management. Additionally, or alternatively, a gateway service may facilitate communication and interaction between entities of a computing environment.

As used herein, the term "entity" refers to a device, component, resource, service, or element within a computing environment such as a cloud computing environment. An entity may be implemented as hardware and/or software. An entity may perform operations associated with utilizing, building, maintaining, or operating a computing environment and/or services deployed in the computing environment. An entity that is implemented as hardware may include one or more of the following: a server, a processor, a memory device, a storage device, a networking device, a power supply device, or a cooling system device. An entity that is implemented as software may include one or more of the following: an operating system, a cloud management platform, a security platform, a development tool, a compute instance, a virtual machine, a container, a storage system, or a service.

5. System Architecture for Utilizing Token-Based Digital Certificates

Figure 6:
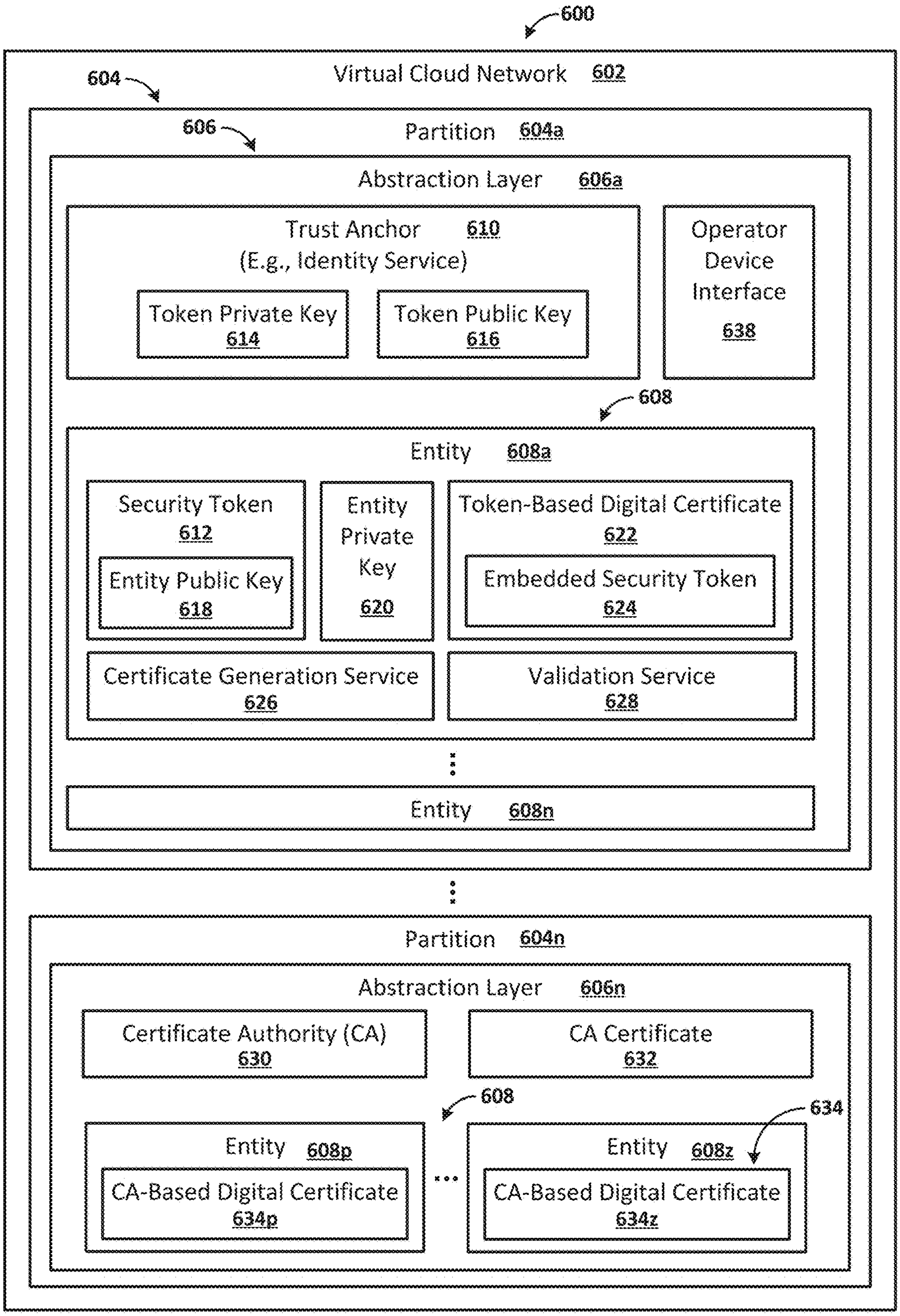
FIG. 6 illustrates features of an example system for generating and utilizing digital certificates that are generated based on security tokens to establish trust for initiating secure connections in accordance with one or more embodiments.

FIG. 6 illustrates features of an example system 600 in accordance with one or more embodiments. In one or more embodiments, the system 600 refers to hardware and/or software configured to perform operations described herein, including generating token-based digital certificates and utilizing the token-based digital certificates to establish trust for initiating secure connections. Examples of operations are described below with reference to FIGS. 7 and 8. In addition to the features described with reference to FIG. 6, the system 600 may include one or more features described above in Section 2, titled "Cloud Computing Technology," and/or in Section 3, titled "Computer System."

In one or more embodiments, the system 600 may include more or fewer components than the components described with reference to FIG. 6. The components described with reference to FIG. 6 may be local to or remote from each other. The components described with reference to FIG. 6 may be implemented in software and/or hardware. The components of system 600 may be distributed over multiple applications and/or machines. Multiple components may be combined into one application and/or machine. Operations described with respect to one component may instead be performed by another component.

As shown in FIG. 6, the system 600 includes a virtual cloud network 602. In one example, the virtual cloud network 602 may include a set of partitions 604 deployed in the virtual cloud network 602, such as partition **604*a* and partition 604*n*. Additionally, or alternatively, the virtual cloud network 602 includes a set of abstraction layers 606, such as abstraction layer 606*a* and abstraction layer 606*n***.

The partitions 604 represent logically or physically isolated portions of the virtual cloud network 602. In one example, one or more of the partitions 604 are allocated to a cloud operator or customer such as a private label cloud (PLC) operator. Additionally, or alternatively, one or more of the partitions may be allocated to a cloud infrastructure provider. In one example, partition **604*a* is allocated to a PLC operator or customer, and partition 604*n* is allocated to a cloud infrastructure provider. In one example, the partitions 604 include realms, such as PLC realms, that isolate portions of the virtual cloud network 602 as between different entities, such as different PLC operators or customers. Additionally, or alternatively, the partitions 604 may include tenant partitions, or tenancies, that isolate portions of the virtual cloud network 602 as between different entities, or tenants, such as PLC operators or customers. Additionally, or alternatively, the partitions 604 may include one or more of the following: service partitions that isolate different services or workloads, geographic partitions that isolate a portion of the virtual cloud network 602 corresponding to a particular geographic region, or network partitions that isolate the virtual cloud network 602** into separate segments or subnets.

The abstraction layers 606 represent distinct tiers in a computing architecture that are logically isolated and abstract from one or more aspects of the computing architecture of one or more underlying tiers. One abstraction layer 606 may logically isolate and abstract one or more aspects of the computing architecture of another abstraction layer 606. In one example, abstraction layer 606*a* is logically isolated and abstracted from one or more aspects of abstraction layer 606*n*. The aspects of the computing architecture of an abstraction layer 606 that another abstraction layer 606 is logically isolated from may include one or more of the following: hardware resources or operations, software resources or operations, data structures, services, or resources. Additionally, or alternatively, aspects of the computing architecture of an abstraction layer 606 that another abstraction layer 606 is logically isolated from may include one or more of the following: the following a computing resource or service, a storage resource or service, a networking resource or service, a database resource or service, a security resource or service, a monitoring resource or service, a monitoring and logging resource or service, a deployment and management resource or service, or an application resource or service. In one example, an abstraction layer 606 may include a tenant partition, or tenancy, that is logically isolated and abstracted from one or more aspects of the computing architecture provided by a cloud service provider in one or more underlying abstraction layers 606. Additionally, or alternatively, an abstraction layer 606 may include a service partition that is logically isolated and abstracted from one or more aspects of the computing architecture that supports one or more services or workloads performed in the service partition.

The virtual cloud network 602 includes one or more entities 608 deployed in various partitions 604 and/or abstraction layers 606 of the virtual cloud network 602. Entity 608*a* and entity 608*n* are deployed in abstraction layer 606*a* of partition 604*a*. Entity 608*p* and entity 608*z* are deployed in abstraction layer 606*n* of partition 604*n*. As shown in FIG. 6 with reference to abstraction layer 606*a* of partition 604*a*, one or more partitions 604 and/or one or more abstraction layers 606 include and/or have access to a trust anchor 610. In one example, the trust anchor 610 is operated by a cloud service provider, for example, on behalf of one or more customers, PLC operators, and/or tenants of the virtual cloud network 602. In one example, the trust anchor 610 is an identity service. The trust anchor 610 issues security tokens to various entities 608. In one example, entity 608 a holds a security token 612 issued by the trust anchor 610.

An entity 608 in partition 604*a* and/or abstraction layer 606*a* that obtains a security token, such as entity 608*a* that obtains security token 612, may utilize the security token for authenticating based on claims about the entity 608 included in a payload of the security token. Additionally, or alternatively, an entity 608 in partition 604*a* and/or abstraction layer 606*a* that obtains a security token, such as entity 608*a* that obtains security token 612, may utilize the security token for generating a token-based digital certificate.

The security token 612 is digitally signed by a token private key 614 held by the trust anchor 610. A token public key 616 corresponding to the trust anchor private key 614 is stored by the trust anchor 610 at a location of the virtual cloud network 602 that is generally accessible to entities 608 deployed in the virtual cloud network 602. The token private key 614 and the token public key 616 represent a token key pair. The token public key 616 can be utilized to authenticate a digital signature appended to security token 612 generated by the trust anchor 610 utilizing the token private key 614.

The security token 612 held by entity 608*a* includes an entity public key 618 embedded within the security token 612. Entity 608*a* holds an entity private key 620 corresponding to the entity public key 618. The entity public key 618 and the entity private key 620 represent an entity key pair. The entity public key 618 can be utilized to authenticate a digital signature generated by entity 608*a* utilizing the entity private key 620. Entity 608*a* holds a token-based digital certificate 622. Entity 608*p* may utilize token-based digital certificate 622 to establish trust with other entities 608 when requesting and/or initiating a secure connection to engage in secure communications with another entity 608. One or more entities 608 may establish trust with one another based at least in part on a token-based digital certificate 622.

A token-based digital certificate 622 may include an embedded security token 624 embedded within the token-based digital certificate 622. The embedded security token 624 may represent a copy of security token 612. The embedded security token 624 may include a copy of entity public key 618. Entity 608*a* may include or have access to a certificate generation service 626. Entity 608*a* may utilize the certificate generation service 626 to generate the token-based digital certificate 622. In one example, entity 608*a* utilizes the certificate generation service 626 to self-generate the token-based digital certificate 622. Additionally, or alternatively, the certificate generation service 626 may generate token-based digital certificates for multiple entities 608 located in the virtual cloud network 602. In one example, entity 608*a* includes a validation service 628. Entity 608*a* may utilize the validation service 628 to validate token-based digital certificates received from other entities 608, for example, in connection with requesting and/or initiating a secure connection between entity 608*a* and another entity 608. In one example, one or more other entities 608 of the virtual cloud network 602, such as entity 608*n*, may include one or more of the features described with reference to entity 608*a*.

As shown in FIG. 6 with reference to abstraction layer 606*n* of partition 604*n*, one or more partitions 604 and/or one or more abstraction layers 606 include and/or have access to a CA 630. The CA 630 may be inaccessible to entities 608 located in one or more other abstraction layers 606 and/or partitions 604 of the virtual cloud network 602. In one example, the CA 630 is inaccessible to one or more entities 608 of partition 604*a* and/or of abstraction layer 606*a*, such as entity 608*a* and/or entity 608*n*. In one example, the CA 630 is inaccessible based on isolation and abstraction provided by one or more abstraction layers 606. Additionally, or alternatively, the CA 630 may be inaccessible based on a set of one or more access policies associated with one or more entities 608. The CA may be inaccessible to one or more entities 608 at least with respect to issuance of CA-based digital certificates. Additionally, or alternatively, the CA 630 may be untrusted by one or more entities 608 of partition 604*a* and/or of abstraction layer 606*a*, such as entity 608*a* and/or entity 608*n*. The CA 630 may be untrusted based at least on being inaccessible by the one or more entities 608 of partition 604*a* and/or of abstraction layer 606*a*.

The CA 630 may issue a CA certificate 632. Additionally, or alternatively, the CA 630 may issue CA-based digital certificates 634 to one or more entities 608 of partition 604*n* and/or of abstraction layer 606*n*, such as entity 608*p* and entity 608*z*. As shown in FIG. 6, entity 608*p* holds CA-based digital certificate 634*p* and entity 608*z* holds CA-based digital certificate 634*z*. Entity 608*p* may utilize CA-based digital certificate 634*p* to establish trust with other entities 608 when requesting and/or initiating a secure connection to engage in secure communications with another entity 608. Entity 608*z* may utilize CA-based digital certificate 634*z* to establish trust with other entities 608 when requesting and/or initiating a secure connection to engage in secure communications with another entity 608. One or more entities 608 may establish trust with one another based at least in part on a CA-based digital certificate 634. In one example, entity 608*p* and entity 608*z* establish trust with one another based on CA-based digital certificate 634*p* and CA-based digital certificate 634*z*, respectively.

In one example, entity 608*a* utilizes a token-based digital certificate 622 to establish trust with entity 634*p*. Additionally, or alternatively, entity 634*p* may utilize CA-based digital certificate 634*p* to establish trust with entity 608*a*. In one example, CA 630 is trusted by entities 608 in partition 604*a* and/or abstraction layer 606*n*, such as to entity 608*a*, for example, even though entities 608 in partition 604*a* and/or abstraction layer 606*n* do not have access to CA 630. In one example, CA certificate 632 is distributed or made generally available to entities 608 in partition 604*a* and/or abstraction layer 606*n*, such as to entity 608*a*, for validating CA-based digital certificates 634. Entity 608*a* may utilize validation service 628 to validate a CA-based digital certificate 634. In one example, trust anchor 610 is trusted by entities 608 in partition 604*n* and/or abstraction layer 606*n*, such as to entity 608*p*. In one example, trust anchor 610 is accessible to entities 608 in partition 604*n* and/or abstraction layer 606*n*, such as entity 608*p*. entities in partition 604*n* and/or abstraction layer 606*n*, such as entity 608*p*, may obtain security tokens from trust anchor 610. An entity 608 in partition 604*n* and/or abstraction layer 606*n* that obtains a security token may utilize the security token for authenticating based on claims about the entity 608 included in a payload of the security token. Additionally, or alternatively, an entity 608 in partition 604*n* and/or abstraction layer 606*n* that obtains a security token may utilize the security token for generating a token-based digital certificate. In one example, entities 608 in partition 604*n* and/or abstraction layer 606*n* may utilize token-based digital certificates, for example, even though entities 608 in partition 604*n* and/or abstraction layer 606*n* have access to CA 630.

In one example, the system 600 includes at least one operator device interface 638 for a cloud operator or a customer to interact with features of the system 600. In one example, a cloud operator or a customer may utilize the operator device interface 638 to provide inputs, such as requests to generate digital certificates, such as CA-based digital certificates and/or token-based digital certificates. Additionally, or alternatively, the inputs to the operator device interface 638 may include requests to initiate a secure connection between entities 608, for example, utilizing one or more CA-based digital certificates and/or one or more token-based digital certificates. Additionally, or alternatively, the operator device interface 638 may output information to the could operator or customer pertaining to features or operations of the system 600.

The operator device interface 638 may render user interface elements and receive input via user interface elements. Examples of interfaces include a GUI, a command line interface (CLI), a haptic interface, or a voice command interface. Examples of user interface elements include checkboxes, radio buttons, dropdown lists, list boxes, buttons, toggles, text fields, date and time selectors, command lines, sliders, pages, or forms. Any one or more of these interface or interface elements may be utilized by an operator device interface 638.

In one example, different components of an operator device interface 638 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, the operator device interface 638 may be specified in one or more other languages, such as Java, C, or C++.

In one example, the operator device interface 638 may be implemented at least in part on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a browser device.

Referring further to FIG. 6, the system 600 may include various different entities 608 located throughout the virtual cloud network 602. An entity 608 may reside on a substrate network, an overlay network, or a network interface. An entity 608 may be implemented in hardware and/or software. An entity may include a host, a node, an agent, a service, a component, an endpoint, or other element. The entities 608 may include one or more substrate entities, one or more interface entities, and/or one or more overlay entities.

As used herein, the term "substrate entity" refers to an entity 608 implemented in a substrate network. As used herein, the term "substrate network" refers to a physical network infrastructure. The substrate network provides a foundation of a virtual cloud network. The substrate network may include physical network devices, such as routers, switches, network links, and other networking components. The substrate network may provide the basic connectivity and transport capabilities necessary for data transmission within and between data centers.

The one or more substrate entities may include substrate hosts, routers, firewalls appliances, load balancers, storage devices, and/or substrate services. A substrate host may include an endpoint within the substrate network, such as a bare metal host, a virtual machine, a container, or a physical server. A substrate service may include a service executing or executable on a substrate entity, such as a firmware service, a network connectivity service, an addressing service, a name resolution service, a security service, a network monitoring service, a load balancing service, and/or a storage service. A firmware service may be associated with functionality or management of network infrastructure components or services, such as network devices, boot-up or initialization process, hardware controls, feature enablement, updates, hardware abstraction, network configuration, and/or network management. In one example, a substrate entity may include a combination of hardware and software. In one example, the one or more substrate entities may include one or more substrate hosts and/or one or more substrate services. In one example, a substrate host may include a bare metal host. In one example, a substrate service may include a firmware service. The substrate entities may communicate with one another and/or with other entities 608 using logical network addresses assigned within the overlay network.

As used herein, the term "network interface" refers to a communication interface between a substrate network and an overlay network, such as a network interface card, a smartNIC, or the like. A network interface may include one or more interface entities, such as a node on the network interface or an interface service executing or executable on the network interface. A node on the network interface may include a programmable hardware component, a memory component, or a gateway component. In one example, a network interface may include a network interface card such as a smartNIC. Additionally, or alternatively, a network interface may include a node or an endpoint on a network interface card or smartNIC.

A gateway component may provide connectivity between the substrate network and the network interface and/or between the network interface and the overlay network. For example, a gateway component may enable communication between overlay entities and substrate entities. Additionally, or alternatively, a gateway component may provide connectivity between the overlay network and external networks, such as the internet or other networks outside the overlay network. For example, an overlay gateway may enable communication between overlay entities and external endpoints.

As used herein, the term "overlay network" refers to a virtual network built on a substrate network using software-defined networking (SDN), virtualization, tunneling, and/or encapsulation technologies. An overlay network may operate independently of the underlying substrate network. An overlay network may provide logical separation and isolation of traffic, enable virtual network provisioning, and/or allow for implementation of various network services and policies. Virtual machines, hosts, containers, or virtual network functions running on a substrate network may be connected via an overlay network.

As used herein, the term "overlay entity" refers to an entity implemented on an overlay network. The overlay network may include multiple overlay entities. The overlay entities may include overlay hosts, overlay services, subnets, overlay controllers, and/or overlay clients. In one example, an overlay entity may include an overlay host. Additionally, or alternatively, an overlay entity may include an overlay service. The overlay entities may communicate with one another using logical network addresses assigned within the overlay network.

An overlay host may include an endpoint within the overlay network, such as a virtual machine, a container, or a physical server. An overlay service may include a service executing or executable on an overlay entity. An overlay service may include a client-specific service such as a service installed by a client. Additionally, or alternatively, an overlay service may include a virtual network creation service, a virtual network management service, a virtual machine orchestration service, a container orchestration service, a network virtualization service, an overlay security service, a load balancing service, a multi-tenancy service, and/or a tenant isolation service.

A subnet may include a virtual network segment that has a distinct addressing scheme and/or a distinct set of network policies or services. A subnet may include a set of overlay hosts. Multiple subnets may be utilized to partition respective sets of overlay hosts. An overlay controller may oversee management, control, provisioning, configuration, and/or monitoring of an overlay network, entities on the overlay network, and/or network policies within the overlay. An overlay controller interacts with the underlying substrate network, for example, to coordinate the operation of overlay hosts and/or communications across virtual switches and tunnels. An overlay client may include an endpoint or device that initiates communication within the overlay network. An overlay client may be a specific instance or role within an overlay host. An overlay host may include a set of overlay clients. An overlay client may include a consumer or user of services provided by overlay hosts or the IaaS. An overlay client may request and consume resources or services from overlay hosts that act as consumers or clients of those resources or services.

The entities 608 may include data repositories. The data repositories may include any type of storage unit and/or device (e.g., a file system, database, collection of tables, or any other storage mechanism) for storing data. Furthermore, a data repository may include multiple different storage units and/or devices. The multiple different storage units and/or devices may or may not be of the same type or located at the same physical site. The data repositories may share one or more storage units with one another. Additionally, or alternatively, the data repositories may include one or more storage units that differ from one another. Furthermore, one or more of the data repositories may be implemented or executed on the same computing system as virtual cloud network 602. Additionally, or alternatively, one or more of the data repositories may be implemented or executed on a computing system separate from virtual cloud network 602.

6. Example Operations for Utilizing Token-Based Digital Certificates

Figure 7:
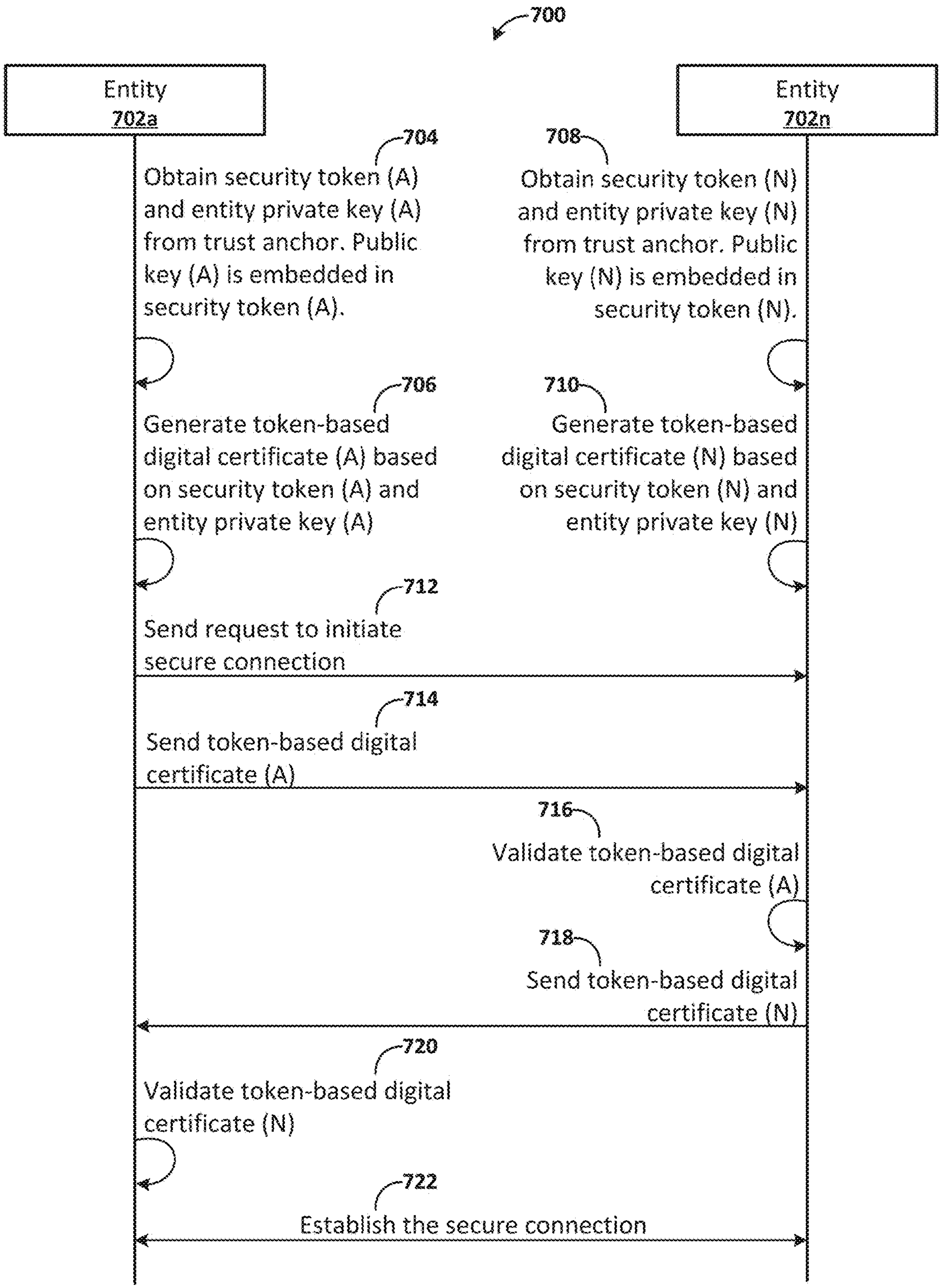
FIG. 7 is a flowchart that illustrates example operations pertaining to utilizing digital certificates that are generated based on security tokens to establish trust for initiating a secure connection in accordance with one or more embodiments.
Figure 8:
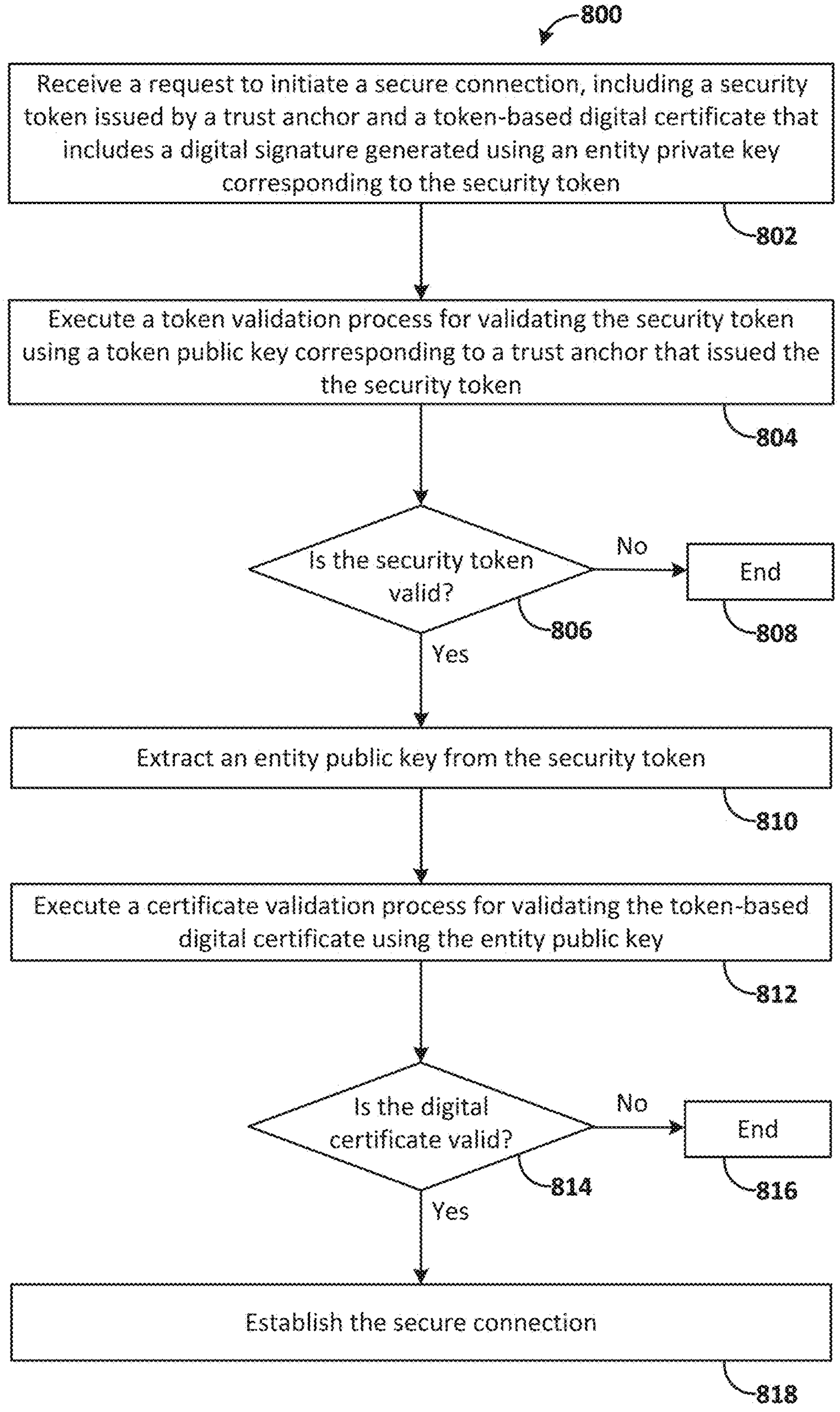
FIG. 8 is a flowchart that illustrates example operations pertaining to validating a digital certificate that are generated based on a security token in accordance with one or more embodiments.

Referring now to FIGS. 7 and 8, example operations pertaining to generating and utilizing token-based digital certificates are further described. One or more operations described with reference to FIGS. 7 and 8 may be modified, rearranged, or omitted. Accordingly, the particular sequence of operations described with reference to FIGS. 7 and 8 should not be construed as limiting the scope of one or more embodiments. In one example, the operations described with reference to FIGS. 7 and 8 may be performed by the one or more components of the system described with reference to FIG. 6.

A. Example Operations for Utilizing Token-Based Digital Certificates to Establish Trust for Initiating a Secure Connection Referring to FIG. 7, example operations 700 pertaining to generating and utilizing token-based digital certificates are further described. As shown in FIG. 7, the operations 700 are described with reference to entity **702*a* and entity 702*n*. In one example, entity 702*a* includes a client resource executing in a cloud environment. In one example, entity 702*n*** includes a server resource executing in the cloud environment. The server resource may be operated by a cloud service provider.

Entity **702*a* obtains, from a trust anchor, security token (A) and entity private key (A) corresponding to security token (A) (Operation 704). Public key (A) corresponding to entity private key (A) is embedded in security token (A). Entity 702*a* obtains security token (A) and entity private key (A) from the trust anchor in response to a request for the trust anchor to execute a security token provisioning process. The trust anchor may be operated by the cloud service provider. After receiving security token (A) and entity private key (A), entity 702***a* generates token-based digital certificate (A) based on security token (A) and entity private key (A) (Operation 706). Entity 702*a* generates token-based digital certificate (A) by embedding security token (A) into a data structure for a digital certificate and self-signing the digital certificate by utilizing entity private key (A) to generate digital signature (A) and appending digital signature (A) to the digital certificate. Security token (A) embedded in token-based digital certificate (A) includes entity public key (A). Entity private key (A) and entity public key (A) represent key pair (A). Public key (A) may be utilized to validate digital signature (A) appended to token-based digital certificate (A).

Entity 702*n* obtains security token (N) and entity private key (N) from the trust anchor (Operation 708). Public key (N) corresponding to entity private key (N) is embedded in security token (N). Entity 702*n* obtains security token (N) and entity private key (N) from the trust anchor in response to a request for the trust anchor to execute a security token provisioning process. After receiving security token (N) and entity private key (N), entity 702*n* generates token-based digital certificate (N) based on security token (N) and entity private key (N) (Operation 710). Entity 702*n* generates token-based digital certificate (N) by embedding security token (N) into a data structure for a digital certificate and self-signing the digital certificate by utilizing entity private key (N) to generate digital signature (N) and appending digital signature (N) to the digital certificate. Security token (N) embedded in token-based digital certificate (N) includes entity public key (N). Entity private key (N) and entity public key (N) represent key pair (N). Public key (N) may be utilized to validate digital signature (N) appended to token-based digital certificate (N).

Entity 702*a* sends a request to initiate a secure connection with entity 702*n* (Operation 712). Additionally, entity 702*a* sends token-based digital certificate (A) to entity 702*n* (Operation 714). In one example, the request to initiate a secure connection with entity 702*n* may include token-based digital certificate (A). Additionally, or alternatively, entity 702*a* may send the request and the token-based digital certificate (A) to entity 702*n* in separate messages.

Upon receiving token-based digital certificate (A), entity 702*n* validates token-based digital certificate (A) (Operation 716). Entity 702*n* may validate token-based digital certificate (A) at least by extracting public key (A) from security token (A) embedded in token-based digital certificate (A) and utilizing entity public key (A) to validate digital signature (A) appended to token-based digital certificate (A). Entity 702*n* trusts the trust anchor that issued security token (A), for example, based on an existing trust relationship with the trust anchor and/or based on having validated security token (A). Based on the trust in the trust anchor, entity 702*n* trusts token-based digital certificate (A) at least upon validating digital signature (A).

In response to the request to initiate the secure connection and/or in response to validating token-based digital certificate (A), entity 702*n* sends token-based digital certificate (N) to entity 702*a* (Operation 718). Upon receiving token-based digital certificate (N), entity 702*a* validates token-based digital certificate (N) (Operation 720). Entity 702*a* may validate token-based digital certificate (N) at least by extracting public key (N) from security token (N) embedded in token-based digital certificate (N) and utilizing entity public key (N) to validate digital signature (N) appended to token-based digital certificate (N). Entity 702*a* trusts the trust anchor that issued security token (N), for example, based on an existing trust relationship with the trust anchor and/or based on having validated security token (N). Based on the trust in the trust anchor, entity 702*a* trusts token-based digital certificate (N) at least upon validating digital signature (N).

Upon entity 702*a* having validated token-based digital certificate (N) and entity 702*n* having validated token-based digital certificate (A), entity 702*a* and entity 702*n* establish the secure connection (Operation 722). The secure connection may be established in accordance with one of the following security protocols: TLS, mTLS, IKE, or HTTPS. Operations pertaining to validating token-based digital certificates are further described below with reference to FIG. 8.

B. Example Operations for Validating Token-Based Digital Certificates

Referring to FIG. 8, example operations 800 pertaining to validating token-based digital certificates are further described. The operations 800 described with reference to FIG. 8 may be combined with one or more operations described with reference to FIG. 7. In one example, with reference to FIG. 7, entity 702*a* executes one or more of the operations 800 described with reference to FIG. 8 to validate token-based digital certificate (N). Additionally, or alternatively, entity 702*n* may execute one or more of the operations 800 described with reference to FIG. 8 to validate token-based digital certificate (A).

As shown in FIG. 8, a system receives a request to initiate a secure connection (Operation 802). The request may include, or may be accompanied with, a security token issued by a trust anchor and a token-based digital certificate that includes a digital signature generated using an entity private key corresponding to the security token. The security token may be embedded in the token-based digital certificate. Additionally, or alternatively, the security token and the token-based digital certificate may be provided in connection with the request as separate artifacts.

The system executes a token validation process for validating the security token (Operation 804). The token validation process includes utilizing a token public key corresponding to a trust anchor that issued the security token to validate a trust anchor digital signature appended to the security token. In one example, the system retrieves the token public key from a location where the token public key is stored and made generally available to various entities. Additionally, or alternatively, the system may obtain the token public key by directing public key request to the trust anchor for the trust anchor to provide the token public key corresponding to the token private key utilized to generate the token digital signature. Upon receiving the token public key, the system utilizes the token public key to validate the trust anchor digital signature.

In one example, the public key request may include the security token received in connection with the request to establish the secure connection. Additionally, or alternatively, the public key request may include a token identifier corresponding to the security token. The trust anchor verifies that the security token corresponds to the token public key based on the security token and/or the token identifier included in the public key request. In response to verifying that the security token corresponds to the token public key, the trust anchor provides the token public key.

The system may validate the trust anchor digital signature by applying a hash function to the trust anchor public key and the payload of the security token to obtain a validation artifact and comparing the validation artifact to the trust anchor digital signature. Validation of the security token issued by the trust anchor establishes trust in the entity that provided the security token and the token-based digital certificate. When the validation artifact matches the trust anchor digital signature, the trust anchor digital signature is valid. The system may determine that the security token is valid based at least in determining that the trust anchor digital signature appended to the security token is valid. When the validation artifact and the trust anchor digital signature do not match, the trust anchor signature is invalid. The system may determine that the security token is invalid based at least on the trust anchor signature being invalid.

Upon executing the token validation process, the system determines whether the security token is valid (Operation 806). When the system determines that the security token is invalid, the system ends the token validation process (Operation 808). When the system determines that the security token is valid, the system proceeds with the operations 800 by extracting an entity public key from the security token (Operation 810) and utilizing the entity public key to execute a certificate validation process for validating the token-based digital certificate (Operation 812).

The certificate validation process includes utilizing the entity public key to validate an entity digital signature appended to the token-based digital certificate. The system may validate the entity digital signature by applying a hash function to the entity public key and the payload of the token-based digital certificate to obtain a validation artifact and comparing the validation artifact to the entity digital signature. When the validation artifact matches the entity digital signature, the entity digital signature is valid. The system may determine that the token-based digital certificate is valid based at least in determining that the entity digital signature appended to the token-based digital certificate is valid. When the validation artifact and the entity digital signature do not match, the entity digital signature is invalid. The system may determine that the token-based digital certificate is invalid based at least on the entity digital signature being invalid.

Upon executing the certificate validation process, the system determines whether the token-based digital certificate is valid (Operation 814). When the system determines that the token-based digital certificate is invalid, the system ends the certificate validation process (Operation 816). When the system determines that the token-based digital certificate is valid, the system proceeds with the operations 800 by establishing the secure connection (Operation 818). The system may establish the secure connection in accordance with one of the following security protocols: TLS, mTLS, IKE, or HTTPS.

7. Miscellaneous; Extensions

Embodiments are directed to a system with one or more devices that include a hardware processor and that are configured to perform any of the operations described herein and/or recited in any of the claims below. Embodiments are directed to a system that includes means to perform any of the operations described herein and/or recited in any of the claims below. In an embodiment, a non-transitory, computer-readable storage medium comprises instructions that, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. Accordingly, the specification and drawings are to be regarded in an illustrative rather than a restrictive sense. The sole and exclusive indicator of the scope of patent protection, and what is intended by the applicants to be the scope of patent protection, is the literal and equivalent scope of the set of claims that issue from this application in the specific form that such claims issue, including any subsequent correction.

References, including publications, patent applications, and patents, cited herein are hereby incorporated by reference to the same extent as if the references were individually and specifically indicated to be incorporated by reference and were set forth in entirety herein.

What is claimed is:

1. A method, comprising:

receiving, by a first entity, a request to establish a secure connection between the first entity and a second entity, wherein the request comprises:

(a) a first security token issued to the second entity by a trust anchor, wherein the first security token comprises a first public key, and (b) a first digital certificate, associated with the second entity, comprising a first digital signature generated using a first private key, wherein the first public key and the first private key represent a first key pair;

validating, by the first entity, the first security token using a second public key corresponding to the trust anchor, wherein based on a trust relationship between the first entity and the trust anchor, the first entity trusts the first public key upon validating the first security token, wherein successful validation of the first security token using the second public key confirms that the first security token was issued by the trust anchor;

validating, by the first entity, the first digital signature of the first digital certificate using the first public key of the first security token, wherein based on the trust in the first public key established by validating the first security token, the first entity trusts the first digital certificate upon validating the first digital signature, wherein successful validation of the first digital signature confirms that the first digital signature was generated using the first private key of the first key pair corresponding to the first security token issued by the trust anchor;

responsive at least in part to validating the first digital signature of the first digital certificate, establishing, at least in part by the first entity, the secure connection between the first entity and the second entity;

wherein the method is performed by at least one device including a hardware processor.

2. The method of claim 1, wherein validating the first digital signature using the first public key of the first key pair corresponding to the first security token comprises:

extracting the first public key from the first security token, wherein the first public key is embedded within the first security token.

3. The method of claim 2, wherein validating the first digital signature using the first public key of the first key pair corresponding to the first security token further comprises:

prior to extracting the first public key from the first security token, extracting the first security token from the first digital certificate, wherein the first security token is embedded within the first digital certificate.

4. The method of claim 1, wherein validating the first security token using the second public key corresponding to the trust anchor comprises:

extracting, from the first security token, a trust anchor signature generated by the trust anchor utilizing a second private key; and validating the trust anchor signature utilizing the second public key, wherein the second public key and the second private key represent a second key pair corresponding to the trust anchor.

5. The method of claim 1, wherein validating the first security token using the second public key corresponding to the trust anchor comprises:

responsive at least in part to receiving the request to establish the secure connection, obtaining, by the first entity, the second public key from the trust anchor at least by: directing, by the first entity, a public key request to the trust anchor for the trust anchor to provide the second public key corresponding to a second private key utilized to generate the first security token; and receiving, by the first entity, the second public key from the trust anchor.

6. The method of claim 5, wherein the public key request comprises at least one of: (a) the first security token received by the first entity in connection with the request to establish the secure connection between the first entity and the second entity, or (b) a token identifier corresponding to the first security token; and wherein the trust anchor verifies that the first security token corresponds to the second public key based on at least one of the first security token, or the token identifier, and responsive to verifying that the first security token corresponds to the second public key, the trust anchor provides the second public key to the first entity.

7. The method of claim 1, wherein the first digital certificate is issued by one of: the second entity, or a certificate generation service associated with the second entity;

wherein a chain of trust for the first digital certificate is based on the first security token being embedded in the first digital certificate.

8. The method of claim 7, wherein the first digital certificate is issued by a certificate authority corresponding to the certificate generation service, wherein the certificate authority is untrusted by the first entity.

9. The method of claim 1, further comprising:

generating, by the second entity, the first digital certificate, at least by:

initializing a certificate data structure, embedding the first security token in the certificate data structure;

generating the first digital signature utilizing the first private key, and appending the first digital signature to the certificate data structure.

10. The method of claim 1, further comprising:

transmitting, by the first entity to the second entity:

a second security token, issued to the first entity by the trust anchor, comprising a third public key corresponding to the second security token, and a second digital certificate, associated with the first entity, comprising a second digital signature generated using a second private key corresponding to the second security token, wherein the third public key and the second private key represent a second key pair corresponding to the second security token;

wherein validation of the second security token, by the second entity using the second public key of the first key pair corresponding to the trust anchor, further establishes trust between the first entity and the second entity;

wherein based on the trust established by the second security token, the second entity trusts the first entity associated with the second digital certificate upon validating the second digital signature using the third public key of the second key pair corresponding to the second security token;

wherein, the secure connection is further established by the second entity responsive at least in part to the second entity validating the second digital certificate.

11. The method of claim 1, further comprising:

transmitting, by the first entity to the second entity, a second digital certificate issued by a certificate authority that is trusted by the second entity;

wherein based on the certificate authority that is trusted by the second entity, the second entity trusts the first entity upon validating the second digital certificate issued by the certificate authority;

wherein, the secure connection is further established by the second entity responsive at least in part to the second entity validating the second digital certificate.

12. The method of claim 11, wherein based on a set of one or more access policies associated with the second entity, the certificate authority is inaccessible to the second entity at least with respect to issuance of digital certificates.

13. The method of claim 1, wherein the first entity and the second entity are deployed at a first abstraction layer of a cloud environment, wherein the cloud environment comprises a certificate authority deployed at a second abstraction layer of the cloud environment, wherein the first abstraction layer is at least partially isolated from the second abstraction layer, and wherein the certificate authority is inaccessible to the first entity and the second entity based at least in part on the first abstraction layer being at least partially isolated from the second abstraction layer.

14. The method of claim 1, wherein the first entity comprises a server resource executing in a cloud environment operated by a cloud service provider, wherein the trust anchor is operated by the cloud service provider, and wherein the second entity comprises a client resource executing in the cloud environment.

15. The method of claim 1, wherein the first entity comprises a server resource executing in a cloud environment, wherein the second entity comprises a client resource executing in the cloud environment, and wherein the trust anchor comprises an identity service executing in the cloud environment.

16. The method of claim 1, wherein the first security token is a JavaScript Object Notation web token.

17. The method of claim 1, wherein the first security token is a proof of possession token.

18. The method of claim 1, wherein the secure connection is established at least in part in accordance with one of: a transport layer security protocol, or a mutual transport layer security protocol.

19. One or more non-transitory computer-readable media comprising instructions that, when executed by one or more hardware processors, cause performance of operations comprising:

receiving, by a first entity, a request to establish a secure connection between the first entity and a second entity, wherein the request comprises:

(a) a first security token issued to the second entity by a trust anchor, wherein the first security token comprises a first public key, and (b) a first digital certificate, associated with the second entity, comprising a first digital signature generated using a first private key, wherein the first public key and the first private key represent a first key pair;

validating, by the first entity, the first security token using a second public key corresponding to the trust anchor, wherein based on a trust relationship between the first entity and the trust anchor, the first entity trusts the first public key upon validating the first security token, wherein successful validation of the first security token using the second public key confirms that the first security token was issued by the trust anchor;

validating, by the first entity, the first digital signature of the first digital certificate using the first public key of the first security token, wherein based on the trust in the first public key established by validating the first security token, the first entity trusts the first digital certificate upon validating the first digital signature, wherein successful validation of the first digital signature confirms that the first digital signature was generated using the first private key of the first security token issued by the trust anchor;

responsive at least in part to validating the first digital signature of the first digital certificate, establishing, at least in part by the first entity, the secure connection between the first entity and the second entity.

20. A system comprising:

at least one device including a hardware processor;

the system being configured to perform operations comprising:

receiving, by a first entity, a request to establish a secure connection between the first entity and a second entity, wherein the request comprises:

(a) a first security token issued to the second entity by a trust anchor, wherein the first security token comprises a first public key, and (b) a first digital certificate, associated with the second entity, comprising a first digital signature generated using a first private key, wherein the first public key and the first private key represent a first key pair;

validating, by the first entity, the first security token using a second public key corresponding to the trust anchor, wherein based on a trust relationship between the first entity and the trust anchor, the first entity trusts the first public key upon validating the first security token, wherein successful validation of the first security token using the second public key confirms that the first security token was issued by the trust anchor;

validating, by the first entity, the first digital signature of the first digital certificate using the first public key of the first security token, wherein based on the trust in the first public key established by validating the first security token, the first entity trusts the first digital certificate upon validating the first digital signature, wherein successful validation of the first digital signature confirms that the first digital signature was generated using the first private key of the first security token issued by the trust anchor;

responsive at least in part to validating the first digital signature of the first digital certificate, establishing, at least in part by the first entity, the secure connection between the first entity and the second entity.

* * * * *